UNITED STATES PATENT OFFICE.

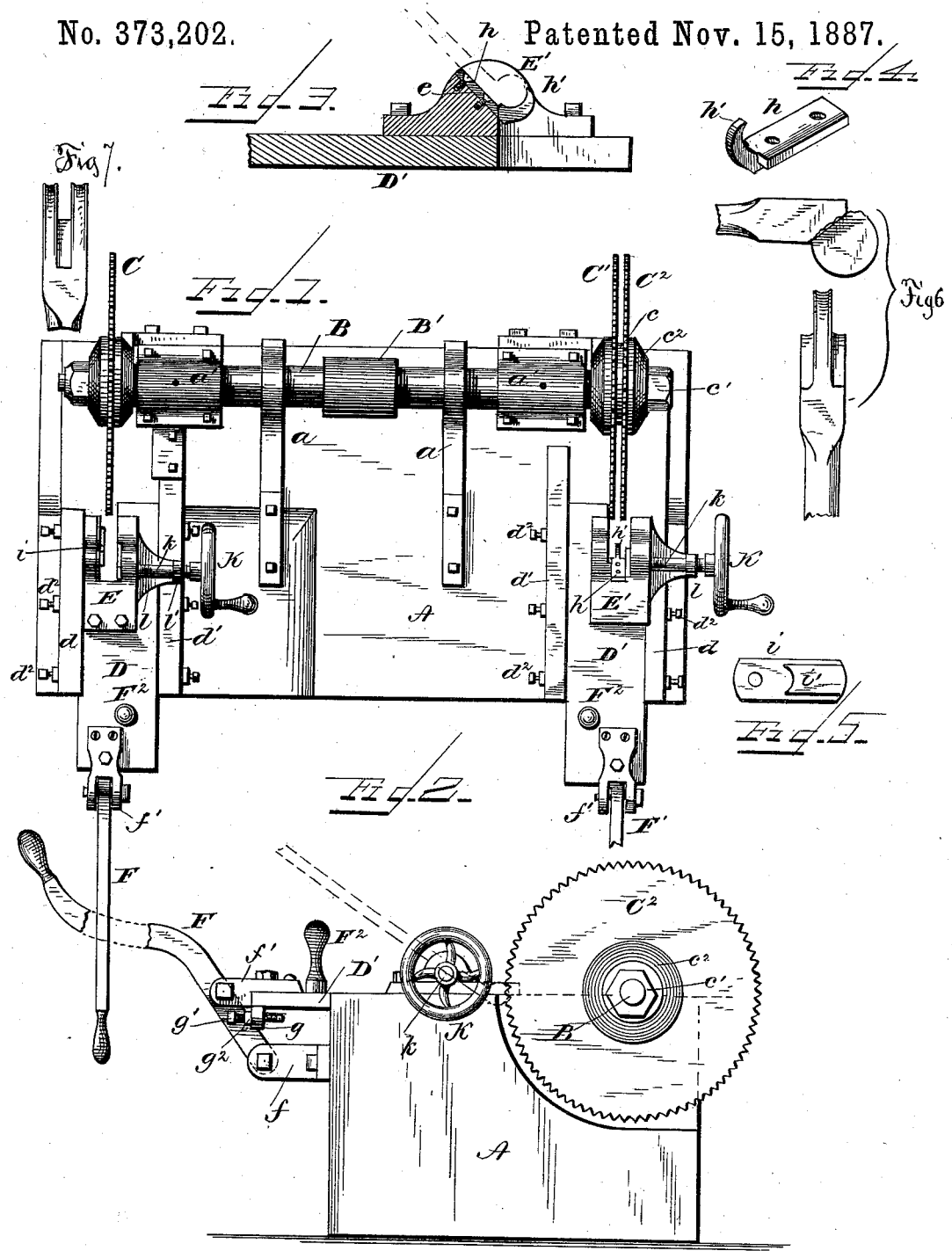

FRANK. SCHREIDT, OF MANSFIELD, OHIO, ASSIGNOR TO THE SCHREIDT & MILLER COMPANY, OF SAME PLACE.

MACHINE FOR SAWING CARRIAGE-TOP IRONS.

SPECIFICATION forming part of Letters Patent No. 373,202, dated November 15, 1887.

Application filed January 12, 1886. Serial No. 188,356. (No model.)

*To all whom it may concern:*

Be it known that I, FRANK. SCHREIDT, of Mansfield, county of Richland, and State of Ohio, have invented a new and useful Improvement in Machines for Sawing Carriage-Top-Iron Joints, of which the following is a full, clear, and exact description, reference being had to the accompanying drawings, making part of this specification.

My invention relates to a machine for sawing the knuckle-joint irons for carriage-tops and other analogous purposes to form the interlapping ears through which the joint-pivot passes, and will be understood from the following description and claims.

In the accompanying drawings, Figure 1 is a plan or top view of a machine embracing my improvements; Fig. 2, a side elevation of the same; Fig. 3, a section through one of the holding-jaws or sockets; Fig. 4, a perspective view of the gage used with the two saws for forming the single central ear or tenon; and Fig. 5, a side elevation of the holder-gage used with the single saw forming the central slit, leaving the two side ears of the joint. Figs. 6 and 7 are detail views showing the blanks after they have been acted upon, one by the single saw, the other by the parallel saws.

A indicates a frame or table of any suitable construction, and of a height sufficient to bring its upper face into convenient relation to an attendant standing in front of it.

B is a horizontal shaft extending across the table from side to side, and mounted in suitable bearings, $a\ a'$, thereon. This shaft B is provided at any convenient point, preferably between its bearings $a\ a'$, with a drum, B', for a driving-belt for actuating it from any suitable motor, and at or near its ends with saws, one end being provided with a single saw, C, and the other with two saws, C' and $C^2$, the latter set at a suitable distance apart to leave the single interlapping ear of the joint between them, the single saw C being of a thickness to correspond with the thickness of the tenon left by the two saws for cutting the slit to receive said tenon. The distance apart of the two saws C' and $C^2$ may be adjusted by removing the interposed collar or washer $c$ and substituting a thicker or thinner one in its place, a nut, $c'$, on the threaded end of the shaft B and a removable collar or washer, $c^2$, permitting the removal of the outer saw, $C^2$, for this purpose. The saw C may in like manner be substituted by a thicker or thinner saw for the same purpose, according to the size or weight of the irons to be operated upon.

In front of the saws, in suitable ways, $d\ d'$, on the frame or table, are two sliding plates or carriages, D and D', one for the single and one for the double saw, and adjustable slightly laterally by means of set-screws $d^2$ for bringing the carriage and its holder E or E' into the desired relation to the saw or saws in connection with which it operates.

F and F' are levers for moving the carriages D and D', one for each, having its fulcrum at its lower end in projecting arms or ears $f$, secured to the front of the frame or table under the carriage and pivoted to ears $f'$, formed on the forward end of said carriage or on suitable brackets secured thereto, as shown. The levers F and F' extend forward and upward into convenient position to be operated by the attendant for moving the carriages back and forth on the table. The forward end of each carriage has a pendent lip or flange, $g$, having a threaded eye or perforation to receive and permit the adjustment of a set-screw, $g'$, which serves to limit the inward throw or movement of the carriage and consequent depth of cut of the saw or saws. A jam-nut, $g^2$, serves to prevent accidental displacement or movement of the set-screw after it has been properly adjusted.

$F^2$ are upright handles on the plates or carriages D and D', which may be used in moving the latter back and forth, if desired.

Upon the rear end of each carriage is rigidly secured a bifurcated holder, E or E', the slot between the upwardly-projecting ears of which has an inclined face or bottom wall at $e$, forming a base on which the iron is to be operated upon or the gage for setting or determining the position of said iron in said slot rests. For use in connection with the two saws, a gage in the form substantially as shown in Fig. 4 is preferred, consisting of a plate, $h$, provided at its lower end with a central hook-shaped tongue, $h'$, conforming on its inner concave face or edge to the shape of the portion of the knuckle resting therein, as indicated by dotted lines in Fig. 3, and of a thickness conforming to and slightly less than that of the central tongue to be left on the iron to be operated upon by the two saws, so as not to interfere with the action of the latter. This is firmly secured in the bottom of the slot in the holder E' by screws or other suitable fastenings, as indicated. For the holder E gages of the form substantially as indicated in Fig. 5 are preferred, $i$ indicating a plate adapted to be secured to one side wall of the slot in the holder, and $i'$ a rib formed on the inner face of plate $i$, and having a concave face on its upper or forward end, into which the rounded end of the knuckle fits snugly, determining the position of said knuckle in the holder and adapting the knuckle to be presented to the action of the single saw cutting the central slit, in a manner that will be readily understood. This gage-plate $i$ is secured, preferably, to the left-hand side or wall of the slot in the holder E, the right ear or wall thereof, as also of the holder E', for convenience in operating the clamping-screws $k$, being provided with a threaded perforation for said screw, the outer end of which has a crank-arm or hand-wheel, K, secured to it for operating it. The holder has a laterally-projecting arm, $l$, having a perforated ear, $l'$, on its end, which forms an additional bearing for the screw $k$, the inner end of which, either directly or by means of a clamping-block swiveled thereon, serves, by the adjustment of the screw, to clamp the iron to be operated upon against the opposite wall of the slot in the holder after it has been properly placed therein, and to firmly hold said iron while it is being operated upon.

The operation of the parts will be readily understood. The saws are in continuous operation when the machine is in use, and the irons, after having the knuckles formed upon them, either by machinery described in other applications of even date herewith or in other suitable manner, are first heated, then properly placed and clamped in the holder, and then subjected to the action of the saw or saws, according to which part of the joint is to be formed, and by the movement of the carriage back and forth they are operated upon in rapid succession, the saws accomplishing quickly and neatly the heretofore slow and tedious work of forming by hand-labor the interlapping ears of the joints. The irons, after being subjected to the action of the saws, are returned to the filing and upsetting machines, described in other applications of even date herewith referred to, for finishing up the parts of the joint.

The single and double saws may of course be arranged upon separate tables with their respective carriages and holders; but the construction described is preferred, as giving a compact arrangement to all the mechanism required for forming the two parts of the joint.

Having now described my invention, I claim as new—

1. The combination, in a machine for forming the interlapping ears of iron joints, of the saw C, carriage D, and the holder E, provided with the gage $i$, arranged and operating substantially as and for the purpose described.

2. The combination, in a machine for forming the interlapping ears of iron joints, of the two saws C' and C², carriage D', and the holder E', provided with the centrally-arranged gage $h$, substantially as and for the purpose described.

3. The combination, with the saw-shaft and the saws arranged thereon, as described, of the carriages D and D' and the holders thereon, arranged and operating substantially as described.

4. In a machine for forming the interlapping ears of iron joints, the combination of the saw, the carriage, the holder on said carriage, provided with the gage for setting the iron to be operated upon, means, substantially as described, for clamping the irons in said holder, the lever for moving said carriage and holder, and an adjustable stop or set-screw for limiting the inward throw of the carriage and holder, substantially as described.

5. In a machine for forming the interlapping ears for the joints of carriage-top and other irons, the combination, with the saw or saws for forming said ears, of the adjustable carriage and its slotted holder, the gage for setting the iron in said holder, and the clamp for securing the iron therein, substantially as described.

6. The combination, in a machine for sawing joint-irons, of the saws C, C', and C², arranged as described, the adjustable carriages D and D', with their respective holders E and E', gages $h'$ and $i'$ in said holders, and means, substantially as described, for clamping and holding the irons in said holders, all substantially as described.

In testimony whereof I have hereunto set my hand this 7th day of January, A. D. 1886.

FRANK. SCHREIDT.

Witnesses:
SAMUEL MARRIOTT,
EFFIE DOTY.